J. W. LANE.

Heating Stove.

No. 2,322.

Reissued July 24, 1866.

WITNESSES:

Manus P. Norton

Jas P. Osborne

INVENTOR.

John W. Lane

N. PETERS. Photo-Lithographer, Washington, D. C.

UNITED STATES PATENT OFFICE.

JOHN W. LANE, OF NEWTON, NEW JERSEY.

HEATING-STOVE.

Specification forming part of Letters Patent No. 48,289, dated June 20, 1865; Reissue No. 2,322, dated July 24, 1866.

*To all whom it may concern:*

Be it known that I, JOHN W. LANE, of Newton, in the county of Sussex and State of New Jersey, have invented a new and useful Improvement in Base-Burning Stoves; and I do hereby declare that the following is a full, clear, and exact description thereof, which will enable those skilled in the art to make and use the same, reference being had to the accompanying drawings, forming part of this specification, in which—

Figure 1:
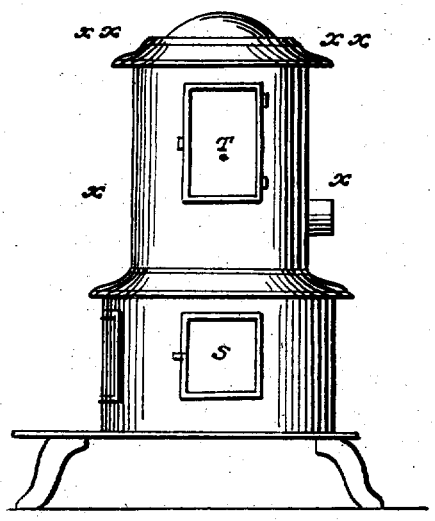
Figure 2:
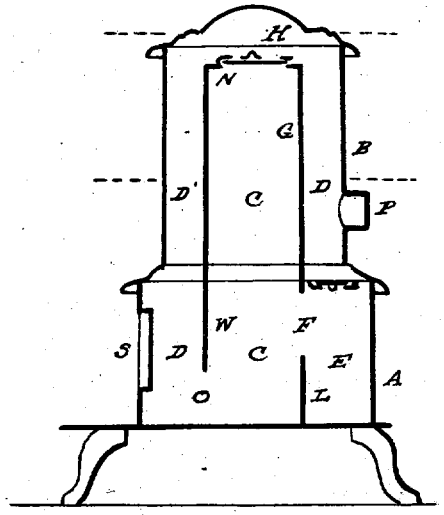
Figure 3:
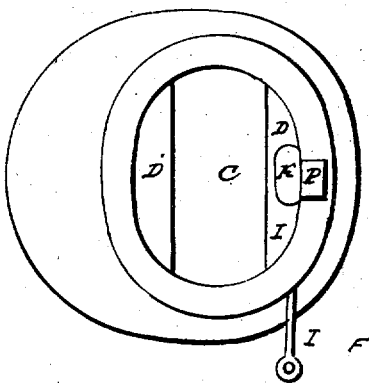
Figure 4:
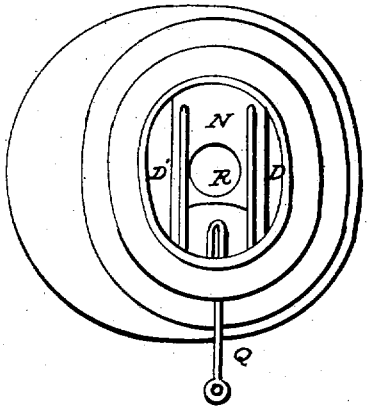
Figure 5:
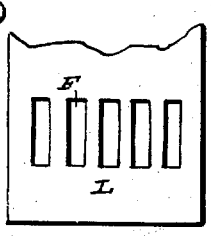

Figure 1 represents a front elevation of this invention. Fig. 2 is a vertical central section of the same. Fig. 3 is a horizontal section of the same, taken in the plane indicated by the line *x x*, Fig. 1. Fig. 4 is a similar section, the line *xx xx*, Fig. 1, indicating the plane of section. Fig. 5 is a partial front elevation of the open grate.

Similar letters of reference indicate corresponding parts.

This invention consists in the employment of a fire-chamber provided with one or more openings near its base and extending from the bottom to the top of a stove, or nearly so, in combination with one or more vertical flues or hot-air chambers in such a manner that wood or other fuel placed in said fire-chamber shall be burned from the bottom or base, and that portion of the wood or other fuel in the upper part of the fire-chamber is charred, and the gasses evolved during this process are consumed and serve to increase the heat of the stove.

My stove is usually constructed in the form of an oval, and of any convenient size and height, although it is quite evident that any other shape than that of an oval may be used without changing the general plan of my invention.

A, Figs. 1 and 2, is the base of the stove. B, same figures, is the upper section, which is in size somewhat less than the said base A. C C is the fire-chamber. D is the rear flue or hot-air chamber, which extends from the top of the base A up to the top of the stove, when it unites with the flue H just over the top of the said fire-chamber.

E is an air-chamber in the base A, and is directly under the said hot-air chamber D, and communicating with the same by means of the damper I, in dotted lines at Fig. 4, which is for the purpose of closing the damper-space K, same figure. By means of this damper the line or direction of the draft is changed or controlled. By its use the direct draft may be had, which is done while the same is open, and when closed a circuit draft is obtained, and is over the draft of the said fire-chamber and from the base thereof.

F is the open grate between the fire pot or chamber C and the base or lower chamber, E, which open grate may fully be seen at Fig. 5. This grate is for the purpose of obtaining the direct draft, which is often desirable. This damper is in the partition-plate L and on the back part of the said stove.

W is the front partition-plate, and extends from the top of plate N, Figs. 2 and 4, downward toward the bottom plate of the stove, leaving the space O between its lower end and the bottom plate of the stove. This space O is the point where the circuit draft enters the front flue or hot-air chamber, D′ D′, Figs. 2, 3, and 4, and is at the very bottom, or nearly so, of the fire-chamber C.

G is the partition-plate between the said back flue or hot-air chamber, D, and the said fire-chamber C, and unites with the partition-plate L at or near the top of the base A.

In the top plate, N, Figs. 2 and 4, which is the upper plate of said fire-chamber C, there is a damper, Q, which is for the purpose of allowing the escape of any unconsumed gases which may gather in the upper part of the said fire-chamber C, also to check the draft of the circuit line and give a draft upward through the entire mass of wood in said fire-chamber, wherever deemed best so to do.

P is the exit-pipe leading to the chimney. When the said damper Q is closed over the damper space R, Fig. 4, there will, of course, be no upward draft through the wood in said fire-chamber C. The wood above the said open space O will be charred or reduced to charcoal.

S, Fig. 1, is the lower door, for the purpose of admitting the necessary atmospheric air to start and continue combustion in the said fire-chamber, also to allow of the removing of ashes, &c., from the said fire-chamber C.

T, Fig. 1, is the door in the upper section, B, for the purpose of supplying the said fire-chamber C with the necessary fuel.

A furnace constructed on the plan above described and of sufficient capacity may be used to a good purpose in the manufacture of charcoal. Stoves constructed upon this principle are cheap and durable, while there is great economy in the use of fuel and the obtaining of a great degree of heat from a small consumption of the fuel, as aforesaid. The entire surface exposed to the room where said stove may be used radiates heat in the most perfect and satisfactory manner.

All parts or compartments of the said stove should be air-tight except where the atmospheric air enters in the place and manner aforesaid for the purpose of starting combustion, &c., and to permit of the escape of any excess of gasses through the damper at the top of the said fire-chamber, and for the direct and circuit drafts as aforesaid described.

I do not generally use a fire-grate horizontally across the fire-chamber at or near the bottom thereof; still, one may be used with good results. Any number of such devices of sufficient size might be employed to good advantage in the manufacture of charcoal for the market.

What I claim as new, and desire to secure by Letters Patent, is—

1. The fuel-chamber C, having its front plate, W, extending downward, leaving the space O, through which the circuit draft enters the front chambers, D′ D′, substantially as described, for the purpose specified.

2. The fuel-chamber C, having its front plate, W, extending downward, leaving the space O, and having its back plate, G, resting directly upon the bottom plate of the stove, and provided with the grate F, substantially as described, and for the purpose specified.

JOHN W. LANE.

Witnesses:

GEORGE M. RYERSON,

L. R. MORRIS.